(12) United States Patent
Ge et al.

(10) Patent No.: US 11,544,814 B2
(45) Date of Patent: Jan. 3, 2023

(54) METHOD AND SYSTEM FOR DISPLAYING A VIDEO POSTER BASED ON ARTIFICIAL INTELLIGENCE

(71) Applicant: SAMSUNG ELECTRONICS CO., LTD., Suwon-si (KR)

(72) Inventors: Lingling Ge, Nanjing (CN); LiMing Shen, Nanjing (CN); Lanlin Tang, Nanjing (CN); Ying Ge, Nanjing (CN); Yu Sun, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/357,220

(22) Filed: Jun. 24, 2021

(65) Prior Publication Data
US 2022/0230274 A1 Jul. 21, 2022

(30) Foreign Application Priority Data

Jan. 19, 2021 (CN) .......................... 202110067898.4

(51) Int. Cl.
*G06T 3/40* (2006.01)
*G06V 20/40* (2022.01)
(Continued)

(52) U.S. Cl.
CPC .......... *G06T 3/4038* (2013.01); *G06T 3/0093* (2013.01); *G06V 20/46* (2022.01); *G06V 20/48* (2022.01); *G06V 30/414* (2022.01)

(58) Field of Classification Search
CPC ..... G06T 3/4038; G06T 3/0093; G06V 20/46; G06V 20/48; G06V 30/414
See application file for complete search history.

(56) References Cited

U.S. PATENT DOCUMENTS

2006/0064716 A1 3/2006 Sull et al.
2015/0220543 A1 8/2015 Chechik et al.
(Continued)

FOREIGN PATENT DOCUMENTS

CN 109905766 A 6/2019
CN 110728119 A 1/2020
(Continued)

OTHER PUBLICATIONS

Springboard India, "How Netflix's Recommendation Engine Works," [https://medium.com/@springboard_ind/how-netflixs-recommendation-engine-works-bd1ee381bf81] Nov. 5, 2019, (5 pages).
(Continued)

*Primary Examiner* — Jennifer Mehmood
*Assistant Examiner* — Andrew Shin
(74) *Attorney, Agent, or Firm* — Sughrue Mion, PLLC

(57) ABSTRACT

A method for displaying a video poster based on artificial intelligence is provided. The method includes obtaining a target video and at least one poster according to a user input, calculating a matching degree of an image description text of the at least one poster and a description text keyword of the target video, and sorting the at least one poster according to the matching degree in an order from high to low, to obtain a sorted poster sequence; performing element separation on one of the at least one poster with a highest matching degree in the poster sequence to obtain a main body element and a background element; and processing the main body element, the background element and title information of the target video according to requirements of a target scene to synthesize a new poster.

12 Claims, 21 Drawing Sheets

(51) Int. Cl.
*G06V 30/414* (2022.01)
*G06T 3/00* (2006.01)

(56) References Cited

U.S. PATENT DOCUMENTS

| | | |
|---|---|---|
| 2019/0012334 A1 | 1/2019 | Petrou |
| 2019/0108188 A1 | 4/2019 | Fu et al. |
| 2020/0021866 A1 | 1/2020 | Koumchatzky et al. |
| 2020/0242172 A1 | 7/2020 | Santiago |

FOREIGN PATENT DOCUMENTS

| | | |
|---|---|---|
| KR | 10-2064292 B1 | 1/2020 |
| KR | 10-2110604 B1 | 5/2020 |
| WO | 2020/000873 A1 | 1/2020 |

OTHER PUBLICATIONS

International Search Report dated Nov. 30, 2021, issued by International Searching Authority in PCT/KR2021/010108.
International Written Opinion dated Nov. 30, 2021, issued by International Searching Authority in PCT/KR2021/010108.

METHOD AND SYSTEM FOR DISPLAYING A VIDEO POSTER BASED ON ARTIFICIAL INTELLIGENCE

CROSS-REFERENCE TO RELATED APPLICATION(S)

This application is based on and claims priority under 35 U.S.C. § 119(a) to Chinese Patent Application No. 202110067898.4, filed on Jan. 19, 2021, in the China Intellectual Property Office, the disclosure of which is incorporated by reference herein in its entirety.

BACKGROUND

1. Field

The present application relates to the technical field of artificial intelligence, and particularly, to a method and a system for displaying a video poster based on artificial intelligence.

2. Background

As smart television becomes more popular, the film-watching behavior of users has changed from "Passive" (that is, passively accepting channel rotation) to "Active" (that is, actively searching for target programs). Also, users often need to select video content of interest among many contents, learn about the programs and make selections through various descriptions of the programs. Therefore, there is a need to clearly distinguish between synopses of video contents, develop richer and clearer content presentation methods, and save labor costs as much as possible through artificial intelligence.

On TV, some posters advertising video contents may not meet the idealized requirements in most of the actual application scene, and new posters may need to be generated using artificial intelligence to meet the requirements.

Although intelligent poster generation service is widely used at present, most of them are used in the advertisement of e-commerce products. The main method of poster generation is to simply fill or replace the content body based on poster template to meet the needs of many posters while service objectives require high-quality preparation material. Also, the posters provided are less flexible and adaptable and do not have the ability to be applied to TV search results pages.

In particular, the existing television poster display method mainly has the following problems:

1) Poor display effect of posters due to readability issue in video display.

Many posters are currently designed to advertise, so there will be a lot of small character information on the poster, which will become unreadable when the poster is scaled down for use on television, leading to readability issues.

FIG. 1 is a schematic view of an original poster. As shown in FIG. 1, because the readability of the header information on the original poster is not modifiable, the conventional poster generating method usually adds a fixed header display when the original poster is subjected to thumbnail design, so the added fixed header display is overlapped with the existing character information on the original poster, thereby causing the readability problem. FIG. 2 illustrates a poster generated by processing the original poster of FIG. 1 in a related art.

In FIG. 2, the upper image shows posters of videos that may be of interest to a user, and when the user clicks on one of the posters, the display effect of the television video display page will be as shown in the lower image. In the lower image, it can be found that the added "Video Title" and "Genre CP" overlap with the existing character information on the original poster, and are not clearly displayed.

2) Deficient film and television image resources and limited design scene.

In the absence of strong operating conditions, due to limited resources, too few scenes that can be developed and implemented, and it is impossible to show a matching vision in the presentation layer even with strong resources.

FIG. 3 is a schematic view showing an ideal effect of a poster, and FIG. 4 is a schematic view showing an actual effect corresponding to the poster shown in FIG. 3. By comparing FIGS. 3 and 4, it can be found that an ideal effect of FIG. 3 is prominent in theme and simple in picture, while the background of the actual effect shown in FIG. 4 is slightly cluttered, and the visual presentation shown in the ideal effect of FIG. 3 is significantly better than the actual effect shown in FIG. 4.

FIG. 5 is a schematic diagram of an example of an ideal effect of an initial design of a poster. With reference to the initial design shown in FIG. 5, processing other posters, for example, processing the poster shown on the left side of FIG. 6, may actually result in a modified design as shown on the right side of FIG. 6, which only intercepts a portion of the content of the original poster and is clearly not adaptable.

3) Weak main information and low film differentiation degree.

Some poster designs do not have clear, film-specific elements to express, and it is difficult to quickly identify the film through the image.

FIG. 7 is a diagram showing an example of a poster with weak main body information, and FIG. 8 is a diagram showing a poster with strong main body information. By comparing FIG. 7 and FIG. 8, it can be found that FIG. 8 has stronger main body information than FIG. 7. That is, the information imparted in the image of FIG. 8 provides more informative context of a content to a user.

Due to the existence of the above problems, the diversity and adaptability of the posters provided by the existing intelligent poster generation service are weak, and the requirements of practical application cannot be met.

SUMMARY

Embodiments of the disclosure provide a method and a system for displaying a video poster based on artificial intelligence, so as to improve the differentiation degree of the video poster.

Additional aspects will be set forth in part in the description which follows, and in part, will be apparent from the description, or may be learned by practice of the presented embodiments.

According to an embodiment, there is provided a method for displaying a video poster based on artificial intelligence. The method includes: obtaining a target video and at least one poster according to a user input, calculating a matching degree of an image description text of the at least one poster and a description text keyword of the target video, and sorting the at least one poster according to the matching degree in an order from high to low, to obtain a sorted poster sequence; performing element separation on one of the at least one poster with a highest matching degree in the poster sequence to obtain a main body element and a background element; and processing the main body element, the background element and title information of the target video according to requirements of a target scene to synthesize a new poster.

The calculating the matching degree of the image description text of the at least one poster and the description text keyword of the target video includes: obtaining the description text keyword of the target video according to description information of the target video; acquiring the image description text by an Image Captain technology for each poster among the at least one poster; and calculating the matching degree between the image description text of the each poster among the at least one poster and the description text keyword of the target video by using a word vector.

The method further includes: filtering out a poster that does not meet physical size requirements of the target scene from the at least one poster.

The performing the element separation on the one of the at least one poster with the highest matching degree in the poster sequence to obtain the main body element and the background element includes: performing instance recognition on the one of the at least one poster to obtain the main body element; performing optical character recognition on the one of the at least one poster to recognize characters; cutting out the main body element and the characters from the one of the at least one poster, and obtaining the background element after performing an environment filling to blank regions.

The processing the main body element, the background element and the title information of the target video according to the requirements of the target scene to synthesize the new poster includes: placing the main body element according to a preset main body position of the target scene; performing stretching or tiling the background element according to a background range of the target scene; and performing unified style conversion on the title information of the target video, and placing the title information in a preset position of the target scene.

According to an embodiment, there is provided a system for displaying a video poster based on artificial intelligence. The system includes: a search keyword acquisition module configured to search a poster database according to a user input and obtain a target video and at least one poster; a poster matching module configured to calculate a matching degree of the image description text of the at least one poster and a description text keyword of the target video, and sorting the at least one poster according to the matching degree in an order from high to low, to obtain a sorted poster sequence; an image segmentation module configured to perform element separation on one of the at least one poster with the highest matching degree in the poster sequence to obtain a main body element and a background element; and a poster recombination module configured to process the main body element, the background element and title information of the target video according to requirements of a target scene to synthesize a new poster.

The search keyword acquisition module is further configured to obtain the description text keyword of the target video according to description information of the target video; the poster matching module includes: an image automatic description module configured to acquire the image description text by an Image Caption technology, for each poster among the at least one poster; and a word vector sorting module configured to calculate the matching degree between the image description text of the each poster among the at least one poster and the description text keyword of the target video by using a word vector.

The poster matching module further includes a scene matching module for filtering a poster that does not meet physical size requirements of the target scene from the at least one poster.

The image segmentation module includes: an instance recognition module configured to perform instance recognition on the one of the at least one poster to obtain the main body element in the poster; an optical character recognition module configured to perform optical character recognition on the one of the at least one poster and recognizing characters; and an environment filling module configured to perform environment filling on blank regions of the one of the at least one poster after cutting out the main body element and the characters to obtain the background element.

The poster recombination module is further configured to: place the main body element according to a preset main body position of the target scene; perform stretching, tiling or environment filling on the background element according to a background range of the target scene; and perform unified style conversion on the title information of the target video, and placing the title information in a preset position of the target scene.

According to an embodiment, there is provided an electronic apparatus including: a memory configured to store at least one instruction; and a processor. The processor is configured to: obtain a target video and at least one poster according to a user input, calculate a matching degree of an image description text of the at least one poster and a description text keyword of the target video, and sort the at least one poster according to the matching degree in an order from high to low, to obtain a sorted poster sequence; perform element separation on one of the at least one poster with a highest matching degree in the poster sequence to obtain a main body element and a background element; and process the main body element, the background element and title information of the target video according to requirements of a target scene to synthesize a new poster.

The processor is further configured to: obtain the description text keyword of the target video according to description information of the target video; acquire the image description text by an Image Captain technology for each poster among the at least one poster; and calculate the matching degree between the image description text of the each poster among the at least one poster and the description text keyword of the target video by using a word vector.

The processor is further configured to: filter out a poster that does not meet physical size requirements of the target scene from the at least one poster.

The processor is further configured to: perform instance recognition on the one of the at least one poster to obtain the main body element; perform optical character recognition on the one of the at least one poster to recognize characters; and cut out the main body element and the characters from the one of the at least one poster, and obtain the background element after performing an environment filling to blank regions.

The processor is further configured to: place the main body element according to a preset main body position of the target scene; perform stretching or tiling the background element according to a background range of the target scene; and perform unified style conversion on the title information of the target video, and placing the title information in a preset position of the target scene.

It can be seen from the above-mentioned technical solution that the present application discloses a method and a system for displaying a video poster based on artificial intelligence, and the present application firstly uses an Image Caption technology to translate image information contained in the poster into characters, that is, the image description text, and then sorting the word vector matching degree according to the image description text and the description text keywords of the target video. The higher the matching degree, the higher the priority of the poster and selecting the most matched poster according to the method; splitting the selected poster into a main body element, a background element and a text element, and processing the split content for later use; converting the title information of the target video in a unified mode, and storing for later use; and finally synthesizing a new poster by using the processed main body element, background element, title information and other elements according to the content arrangement specification of the target scene.

With limited design resources and based on artificial intelligence technology, the above-mentioned technical solutions of the present application can intelligently design and display video posters with higher matching degree and better expression of a scene display.

The present application can solve the problems that the existing poster quality control is not uniform. When the existing poster is displayed as a search result on TV, the recognition degree is low and the poster content may be unreadable. In addition, the application scene of the current poster is limited, and the technical solution provided by the present application can optimize the quality by fixing conditions, such as a certain proportion not being matched or the shape being stretched, thereby improving practicability of the poster and user experience.

In the present application, the poster combination with the fixed size can be used, pictures with the same meaning but different conditions can be intelligently selected, and the method is applied to wider and richer scenes.

The content relevance of the AI poster and the program can be matched according to needs in the present application, and the proportion of the main character in the picture is amplified by the artificial intelligence technology, so that the recognition degree of the film is greatly improved in a character highlighting mode, and the content of the film can be identified at a glance by a user through the poster.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
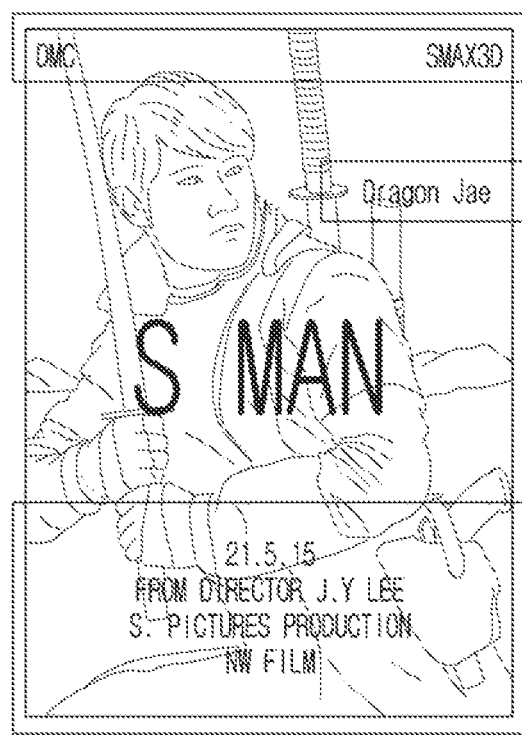
FIG. 1 is a schematic diagram of an original poster in a related art.
Figure 2:
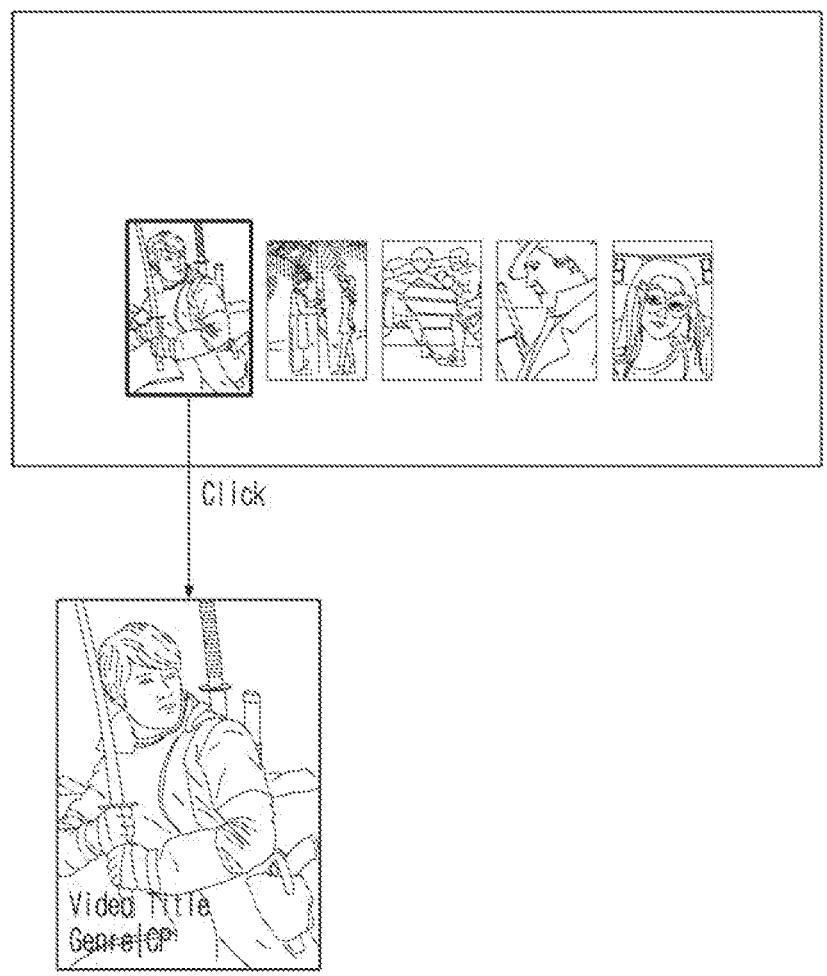
FIG. 2 is a schematic diagram of a poster generated by processing the original poster shown in FIG. 1.
Figure 3:
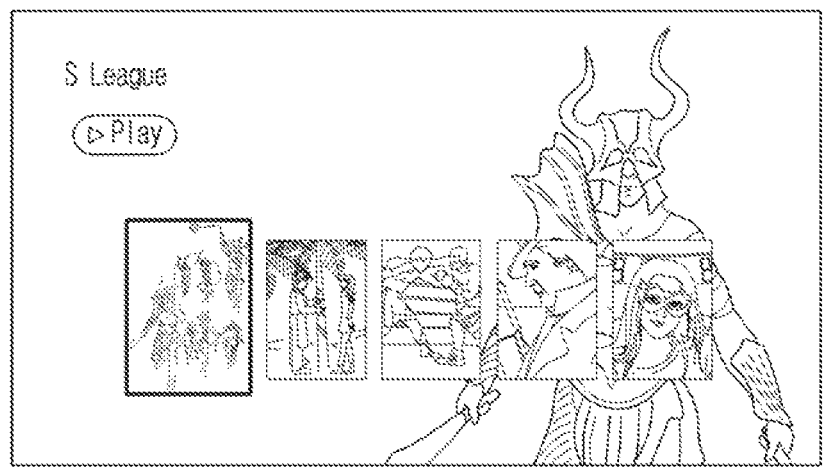
FIG. 3 is a schematic diagram illustrating an ideal effect of a poster.
Figure 4:
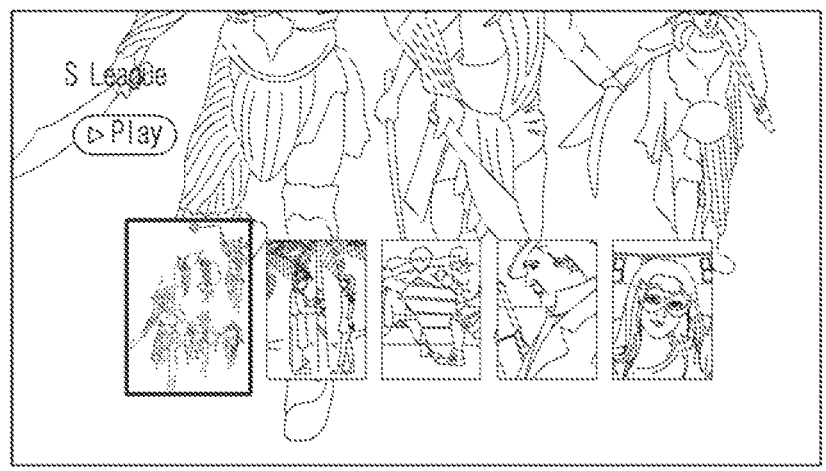
FIG. 4 is a schematic view illustrating an actual effect of the poster shown in FIG. 3.
Figure 5:
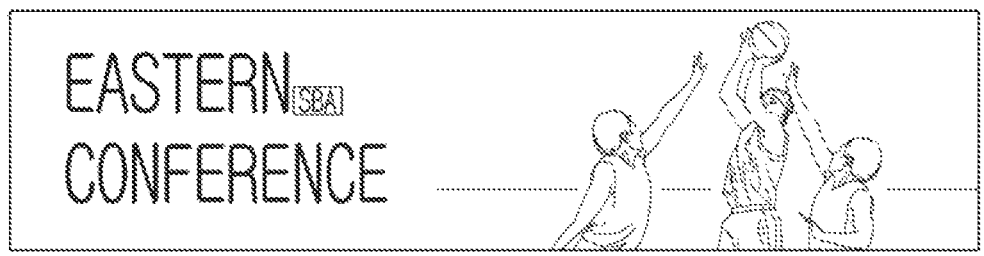
FIG. 5 is a schematic diagram illustrating an ideal effect of an initial design of a poster.
Figure 6:
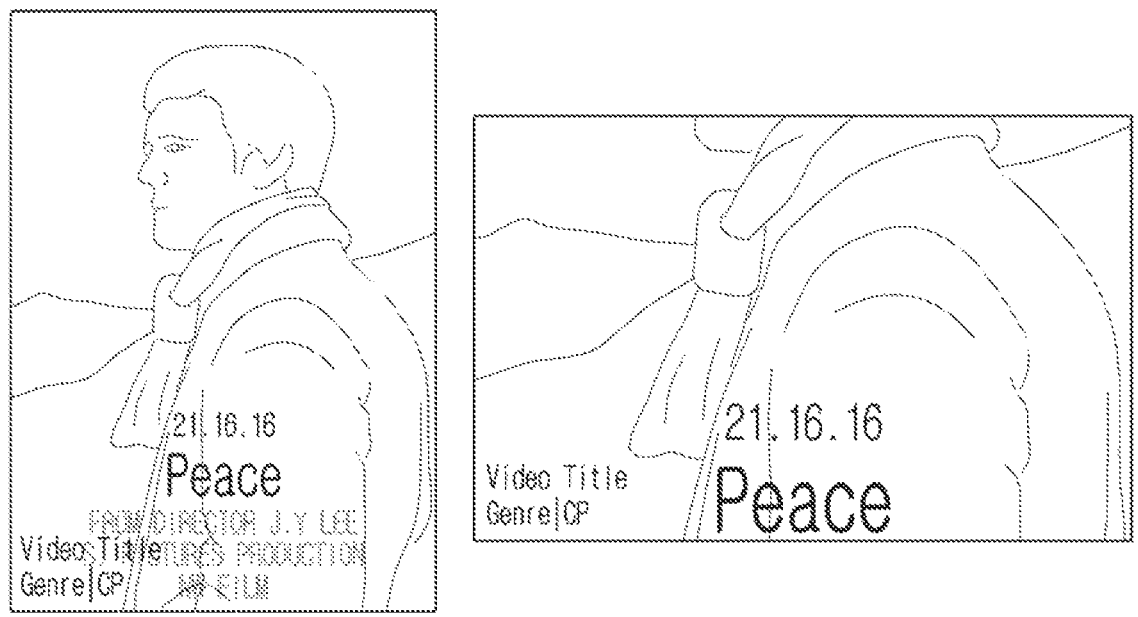
FIG. 6 is a schematic diagram illustrating an actual effect of a poster variant design.
Figure 7:
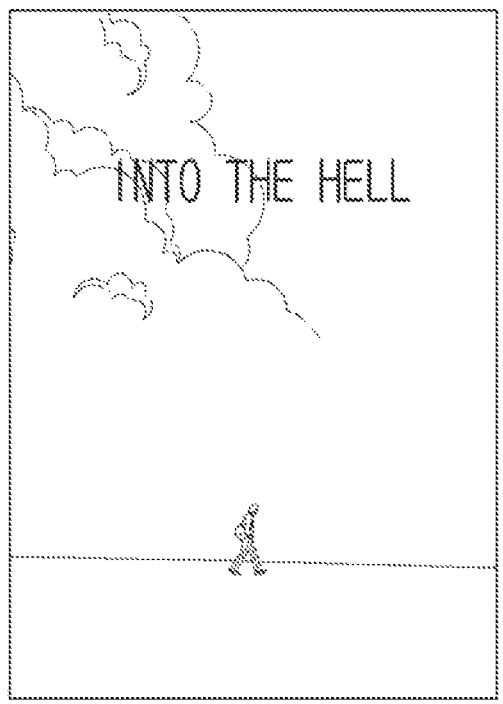
FIG. 7 is a schematic diagram of a poster with weak main body information.
Figure 8:
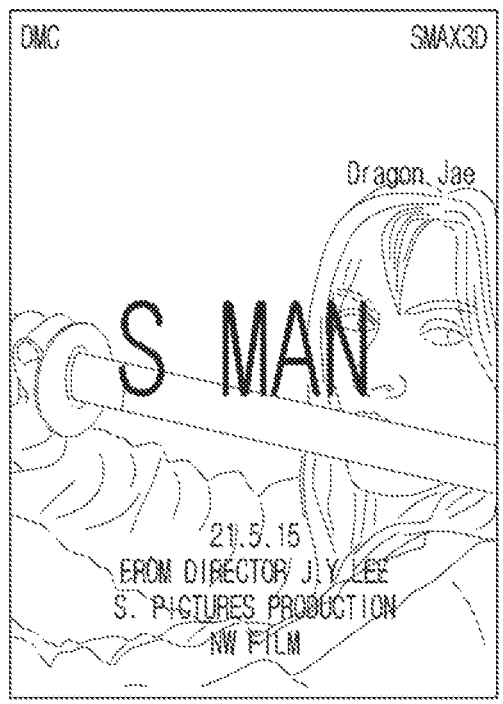
FIG. 8 is a schematic diagram of a poster with strong main body information.

In order to make the purposes, technical solutions and advantages of the present application to become more apparent, reference is now made to the accompanying drawings, which illustrate, by way of example, further details of the one or more embodiments of the disclosure.

In order to solve the problems in the prior art, the one or more embodiments provide a method for displaying video poster based on artificial intelligence, which includes the following steps:

Step S1: searching to obtain a target video and at least one poster according to a user instruction, calculating the matching degree of the image description text of the at least one poster and the description text keyword of the target video, and sorting the at least one poster according to the matching degree from high to low, to obtain a sorted poster sequence.

In the step S1, the specific sorting method can be as follows: obtaining a keyword of the target video according to the description information of the target video, wherein the description information of the target video may be received from an external server and stored in a memory of the electronic apparatus.

For each poster, acquiring an image description text by an Image Captain technology and calculating the matching degree between the image description text of each poster and the keyword of the target video by using the word vector, and sorting the corresponding posters according to the calculated matching degree from high to low.

In addition, after the at least one poster is obtained, the posters that do not meet the target scene are filtered out according to the requirements of the target scene.

Step S2: performing element separation on the poster with the highest matching degree in the poster sequence to obtain a main body element and a background element.

The element separation processing in the step specifically includes performing the following operations on the poster with the highest matching degree in the poster sequence; performing instance recognition on the poster to obtain main body elements in the poster; performing optical character recognition on the poster to recognize characters in the poster; and cutting out the main body element and the characters from the poster, and obtaining the background element after performing environment filling to the blank regions.

Further, the separation processing may include obtaining the main body element and background element, storing for later use.

Step S3: processing the main body element, the background element and the title information of the target video according to the requirements of the target scene to synthesize a new poster.

Specifically, the processing in the step may include the following steps of: placing the main body element according to a preset main body position of the target scene; stretching and/or tiling the background element according to the background range of the target scene; and performing unified style conversion on the title information of the target video, and placing it in a preset position of the target scene.

Figure 9:
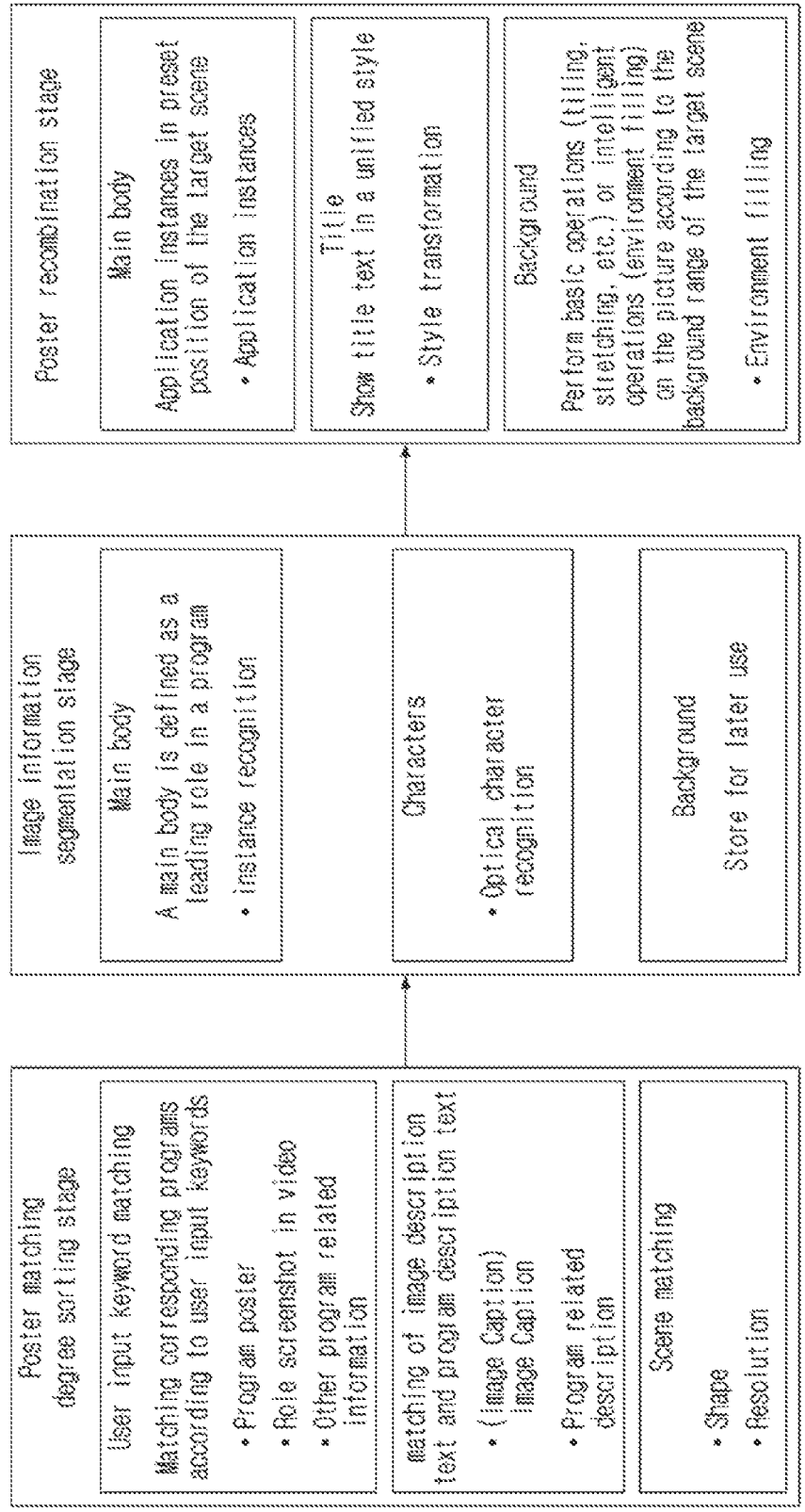
FIG. 9 is a flow diagram illustrating a method for displaying a video poster according to an embodiment.

In an embodiment, the method for displaying video poster can be divided into three stages as shown in FIG. 9: a poster matching degree sorting stage, an image information segmentation stage and a poster recombination stage.

In a poster matching degree sorting stage, corresponding programs are mainly matched according to keywords input by a user to obtain program posters, role screenshots in videos and related information of other programs, then matching the image description text with the program description text, wherein the image description and the program related description are specifically used for matching; in addition, scene matching can be performed, and specifically includes: poster shape and resolution matching. It should be noted that in the terms films, programs and videos may be used interchangeably, and film posters, program posters and video posters may be used interchangeably throughout the disclosure.

In the image information segmentation stage, the main body of the poster is identified by instances, the characters in the poster are identified by optical character recognition (OCR), and the background after cutting out the main body and the characters is stored for later use. Here, a main body may include a protagonist in a program.

In the poster recombination stage, the method mainly includes: applying a main body instance at a preset position of the target scene, displaying the title text of the program at a uniform position by using a uniform style, and performing basic operation (including tiling, stretching and the like) or intelligent operation (performing environment filling on the image) on the picture according to the background range of the target scene. The environment fill operation may also be performed when separating out background element.

The three stages are described in further detail below with reference to FIGS. 10 to 12.

Figure 10:
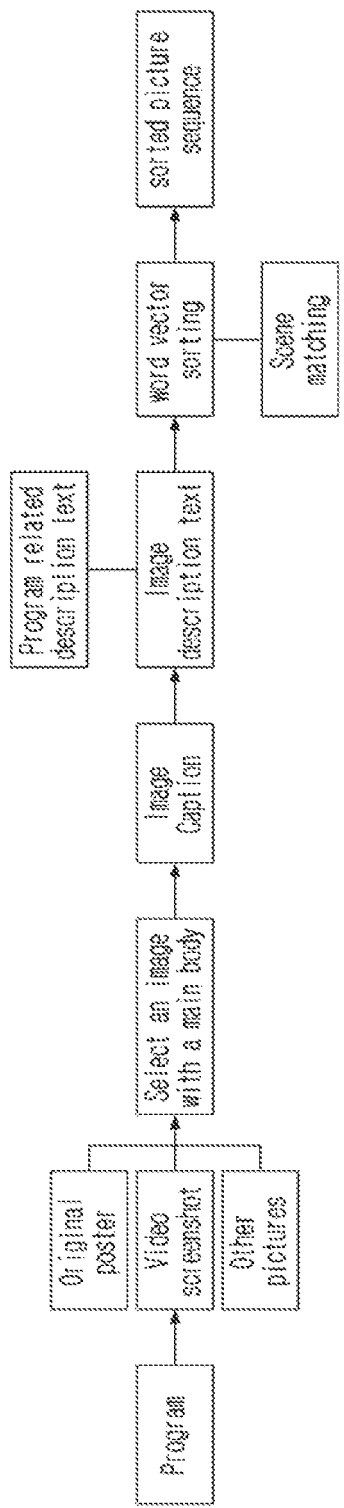
FIG. 10 is a process flow diagram of a poster matching degree sorting stage according to an embodiment.

FIG. 10 is a process flow diagram of a poster matching degree sorting stage according to an embodiment. Referring to FIG. 10, the processing of the poster matching degree sorting stage mainly includes: first, after searching a corresponding program (also referred to as a video, a film, etc., as described above) according to a user instruction, a related image (also referred to as a picture, a poster, a poster image, etc.) is searched in a database. The source of the original material in the database can be: original posters, video shots, and related pictures in the network.

Then, the most suitable poster of the corresponding program is determined according to the matching degree of the main person in the image, the matching degree of the keyword input by the user, the matching degree of the image description text of the image and the description text keyword of the program, and the matching degree of the condition of the image and the target scene to obtain an ordered picture sequence, namely: poster sequence.

An automatic description of the image may mean that the content in the image is automatically identified by using an Image Caption technology and translated into an image description text.

The keywords in the description text of the program are the combination of the behaviors and actions related to the main characters extracted from the description text of the program into description sentences, for example: the keywords of the program description text are composed of "person"+"location"+"behavior".

Figure 11:
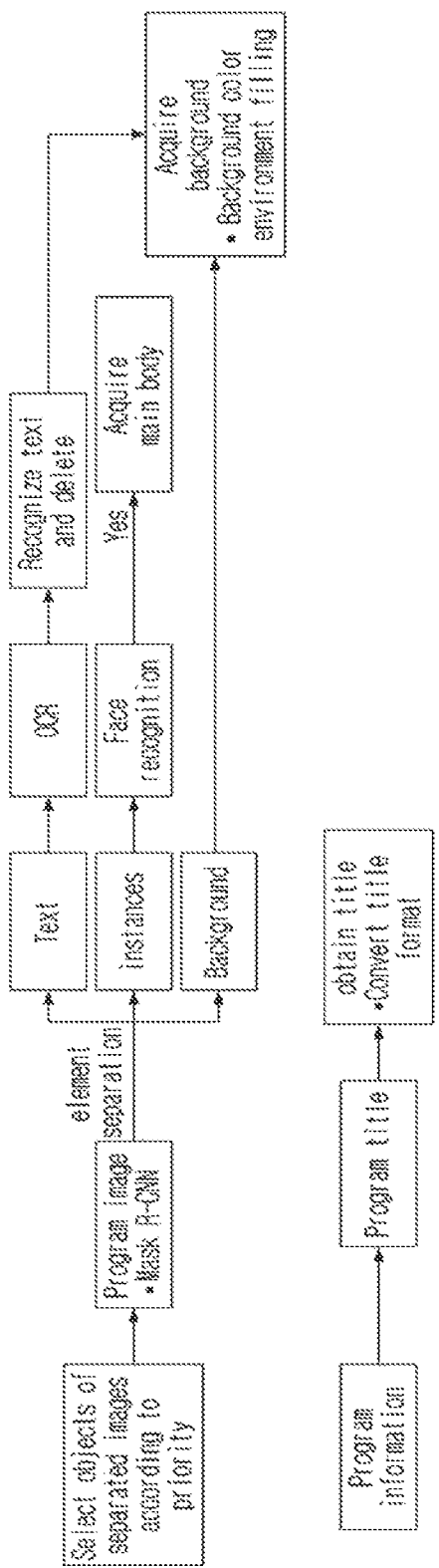
FIG. 11 is a process flow diagram of an image information segmentation stage according to an embodiment.

FIG. 11 is a process flow diagram of an image information segmentation stage according to an embodiment. Referring to FIG. 11, the processing of the image information segmentation stage includes: selecting a poster image from a poster sequence according to the priority from high to low, and using it as the object of element separation, which is divided into: main body element, background element and text.

In addition, the image information segmentation includes performing face recognition of an instance in the image to obtain a main body element; performing optical character recognition (OCR) on the text in the image, recognizing the text and deleting the text; cutting out the main body element and the characters from the image, acquiring the background element, and performing environment filling to the blank regions.

For the program (i.e., video, film) itself, the program title is obtained according to the program information, and the title is uniformly formatted and stored for later use.

Figure 12:
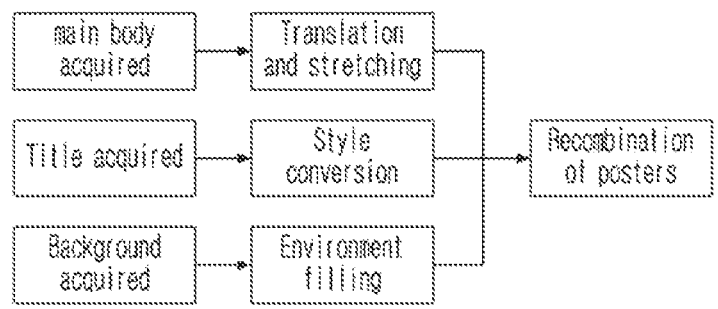
FIG. 12 is a process flow diagram of a poster recombination stage according to an embodiment.

FIG. 12 is a process flow diagram of a poster recombination stage according to an embodiment. Referring to FIG. 12, the processing of the poster recombination stage includes: performing necessary translation and/or stretching on the acquired main body element according to the requirement of the target scene, and placing the main body element according to the preset main body position of the target scene; for the acquired background element, stretching and/or tiling the background element according to the background range of the target scene, and performing necessary environments filling; and after uniform style conversion is performed on the acquired title information, placing the obtained title information at a preset position of the target scene.

Figure 13:
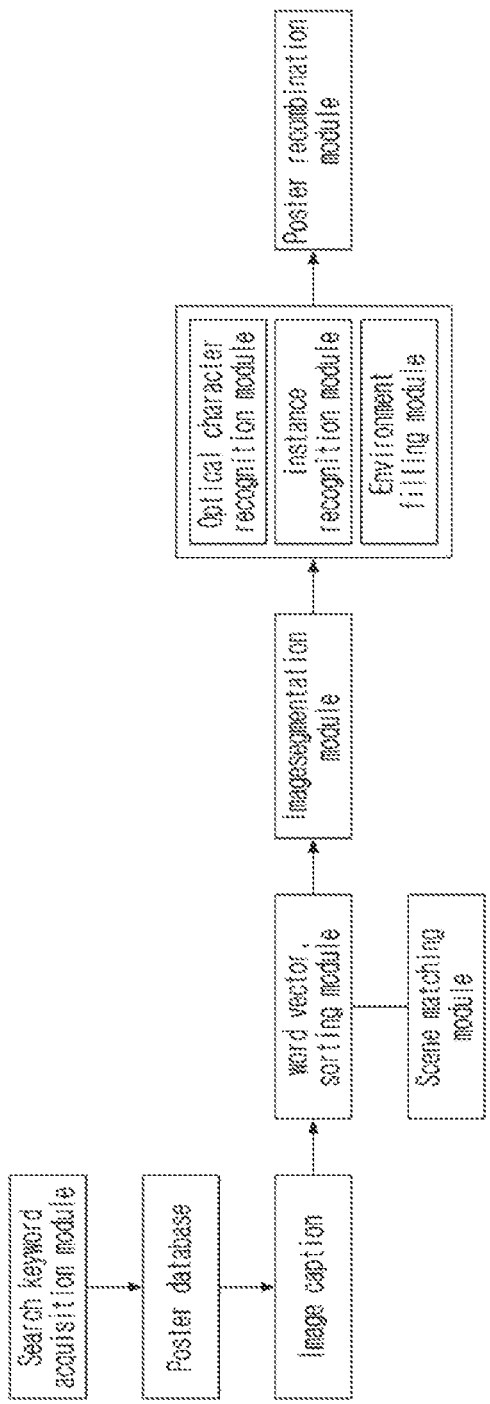
FIG. 13 is a schematic diagram illustrating a composition and a structure of a system for displaying a video poster based on artificial intelligence according to an embodiment.

Corresponding to the above-mentioned method for displaying video poster, the one or more embodiments provide a corresponding system for displaying video poster based on artificial intelligence, and the structure schematic diagram of the system is shown in FIG. 13. The system for displaying video poster includes the following modules: a search keyword acquisition module, a poster database, a poster matching module, an image segmentation module, an optical character recognition module, an instance recognition module, an environment filling module and a poster recombination module. Although not shown in FIG. 13, the poster matching module may include an image automatic description module, a word vector sorting module and a scene matching module.

The search keyword acquisition module is used for acquiring keywords for searching the target video and the poster according to the user instruction, and searching by the keywords to obtain the target video and a plurality of posters.

The poster matching module is used for calculating the matching degree of the image description text of a plurality of posters and the description text keyword of the target video, and sorting a plurality of posters according to the matching degree from high to low, to obtain a sorted poster sequence. As previously stated, the poster matching module specifically includes an image automatic description module, a word vector sorting module and a scene matching module, wherein:

The image automatic description module is used for processing each poster by adopting an Image Caption technology to acquire a text sequence describing the content corresponding to the poster, the text sequence is called an image description text of the poster, and the image automatic description module provides the image description text of the poster to the word vector sorting module;

The scene matching module is used for acquiring the requirement of the target scene on the poster, calculating the matching degree of the poster and the target scene and providing the matching degree to the word vector sorting module, and can be used for filtering out the poster which does not meet the requirement of the target scene from the searched posters.

The word vector sorting module is used for calculating the matching degree between the image description text of each poster and the description text keyword of the target video by using the word vector, and sorting the corresponding posters according to the calculated matching degree from high to low. The word vector sorting module also depends on the matching degree between the posters provided by the scene matching module and the target scene to filter the posters which do not conform to the target scene. The description text keyword of the target video can be extracted by the search keyword acquisition module according to the description information of the target video.

The image segmentation module further includes: the instance recognition module, the optical character recognition module and the environment filling module, for performing the following operations on the poster with the highest matching degree in the poster sequence.

The instance recognition module is used for performing case recognition on the poster to obtain main body elements in the poster; for example: the instance recognition module can recognize instance types in an instance area of the poster, such as people, animals, articles and the like, and output people information in the poster through a face recognition technology;

The optical character recognition module is used for performing optical character recognition on the poster and recognizing text information in a text area of the poster; and The environment filling module is used for performing environment filling on the blank part of the poster after cutting out the main body element and the characters to obtain the background element.

An image may generate a void in the background after removing a main body element in an example area or text information in a character area (that is, there will be a blank part in the background), when the images are converted at different resolutions, the situation that the original poster background cannot cover part of the area under the new resolution is generated, and the environment filling module is used for expanding and filling the background area so that the background covers the target poster.

The poster recombination module is used for processing with the constraints of examples, backgrounds, characters and positions of poster elements in an image as input to rearrange the poster elements and generate a new poster.

The poster recombination module may be used for placing the main body element according to a preset main body position of the target scene; stretching, tiling and/or environment filling the background element according to the background range of the target scene; and performing unified style conversion on the title information of the target video, and placing it in a preset position of the target scene.

The following example embodiments are illustrated for detailed description.

Example I

In an example, the user sends an instruction for searching a certain film to the intelligent television, the intelligent television applying the technical scheme of the application searches a plurality of relevant posters according to the instruction of the user, and then intelligently reorganizes the posters to generate corresponding posters to be displayed to the user so as to increase the readability of the posters and the recognition degree of the film.

The embodiment will now be described with reference to FIGS. 14A to 16. Because of the length, the implementation flow diagram of the embodiment is divided into two parts, which are respectively shown in the two figures, specifically the first implementation flow diagram shown in FIG. 14A, the second implementation flow diagram shown in FIG. 14B, and the third implementation flow diagram shown in FIG. 15.

Figure 14A:
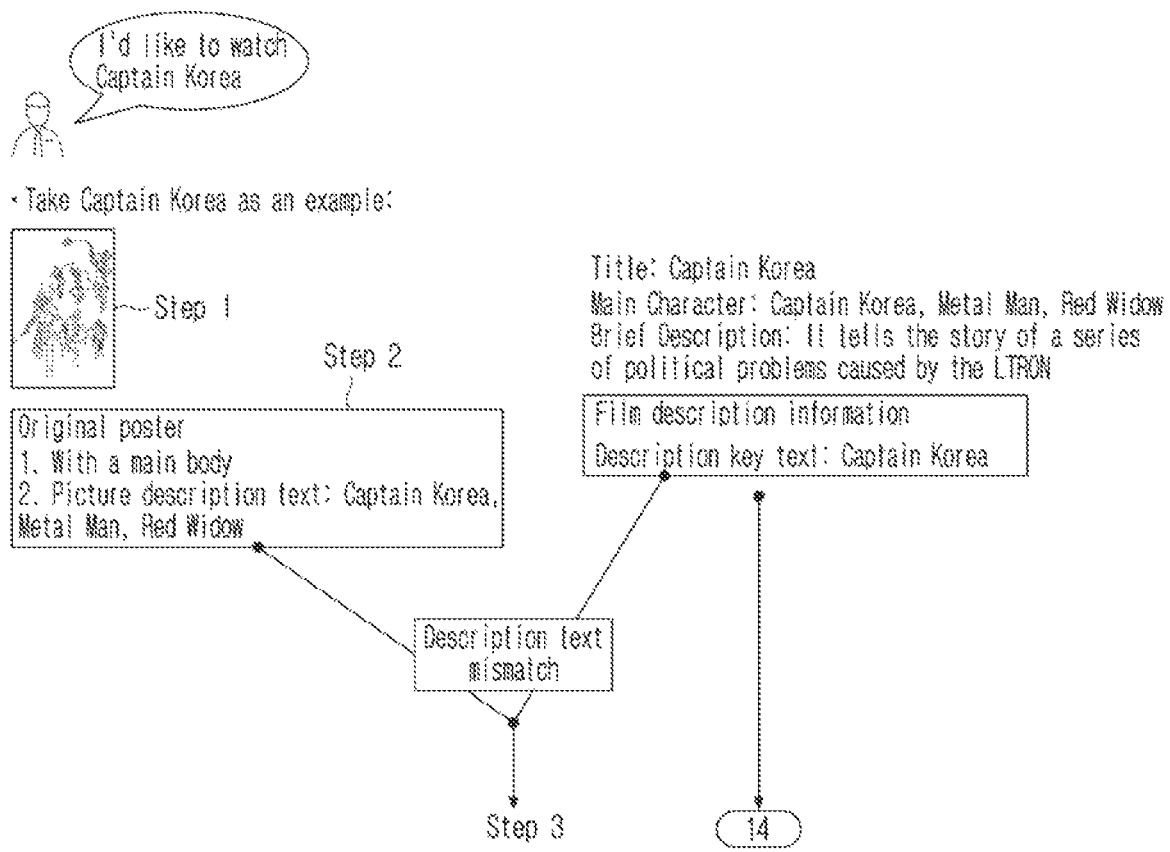
FIG. 14A is a first schematic diagram of an implementation process of Example I of the present application.
Figure 14B:
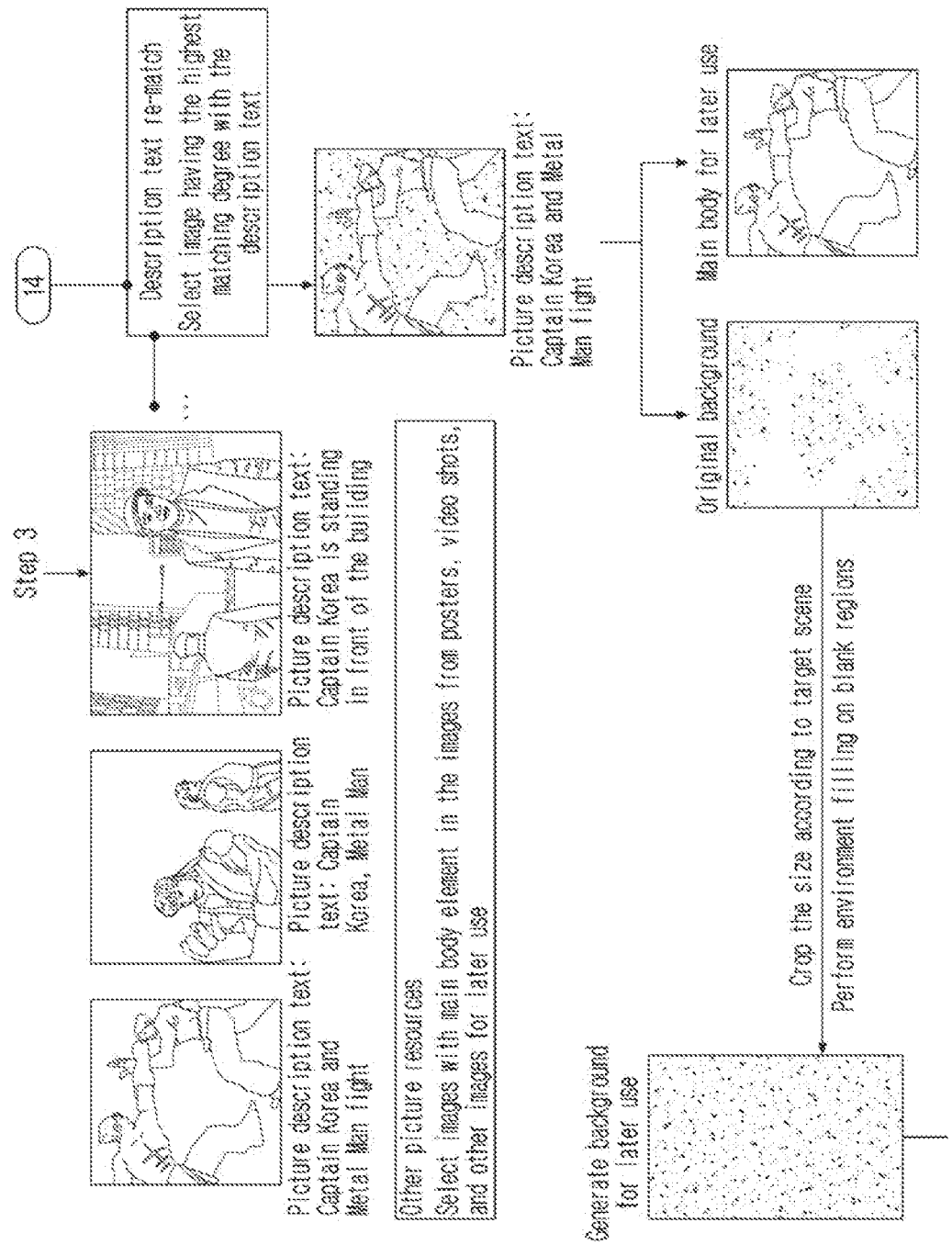
FIG. 14B is a first schematic diagram of an implementation process of Example I according to an embodiment.

Referring to FIG. 14A, when the user expresses an instruction of "I want to see Captain Korea", the smart television performs a film search, assuming that "Captain Korea" is searched. This program resource is exemplified as follows:

Step 1: a film search is performed according to user instructions to obtain program resources related to user requirements, and an image with a main body is selected from the resource images, as shown in the original poster of "Captain Korea" in FIG. 14A.

Step 2: the original poster of Captain Korea is processed by Image Caption technology, and the image description text is obtained as follows: Captain Korea, Metal Man, Red Widow and determines that the original poster has a main body.

Also, the original poster is analyzed to obtain the film description information of the film, and the description key text of the film as follows: Captain Korea. The description key text may also be referred to as describing text keywords.

Then, the similarity between the image description text of the original poster and the description key text of the film is calculated by using the word vector, and it is determined whether they match or not. In the example, they do not match, i.e., the image description text of the original poster of the film does not match the description information of the film, so it is necessary to perform step 3, search other image resources, pick up the image with the main body with a higher matching degree, and perform a re-matching of the description text.

Step 3: searches are made from other image resources (for example: posters, video shots, and other images, also referred to as image library), from which images with main body element in the images are selected for later use. As shown in FIG. 14, assuming that three images are searched, their image description texts are respectively: Captain Korea and Iron Man fight, Captain Korea and Metal Man, Captain Korea is standing in front of the building.

Performing description text re-matching based on the searched images, namely: the word vector is used for calculating the similarity between the image description text of the images and the description key text of the film, "Captain Korea", and the image with the highest matching degree is selected. In the present embodiment, it is assumed that the selected image having the highest matching degree is an image whose image description text is "Captain Korea and Metal Man fight".

Step 4: element separation is performed on the image with the highest matching degree, the image is separated into a main body, a background and characters, and then the image elements are processed. The element separation further includes: cutting out the main body from the image and storing for later use; cutting out characters from an image, converting the characters in a uniform format, and storing for later use; and cutting out the areas of the main body and the characters from the original background, cropping size according to the target scene, filling the blank positions with environment colors and generating a new background and storing for later use.

Figure 15:
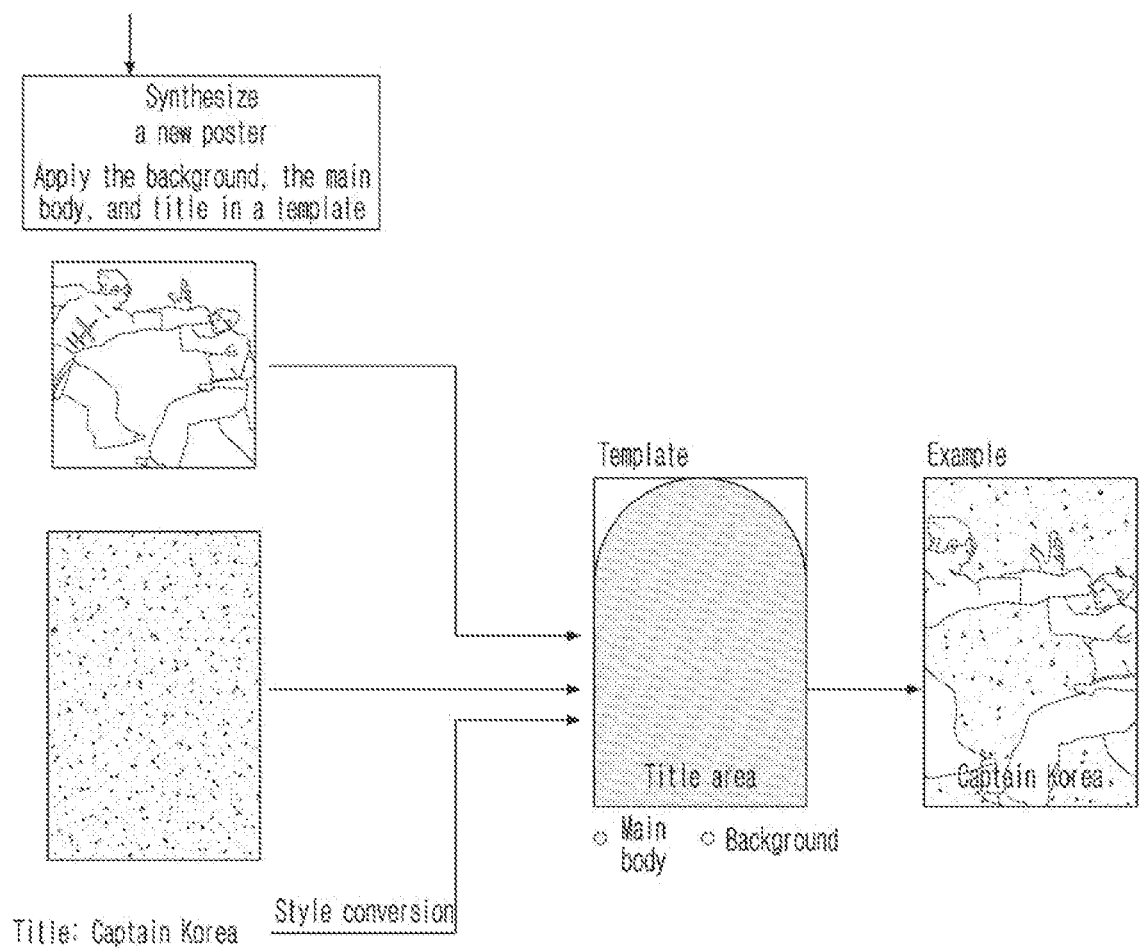
FIG. 15 is a third schematic diagram of an implementation process of Example I according to an embodiment.

Step 5: the processed main body, the background and the characters are recombined according to the prepared template style standard to synthesize a new poster, as shown in FIG. 15.

Figure 16:
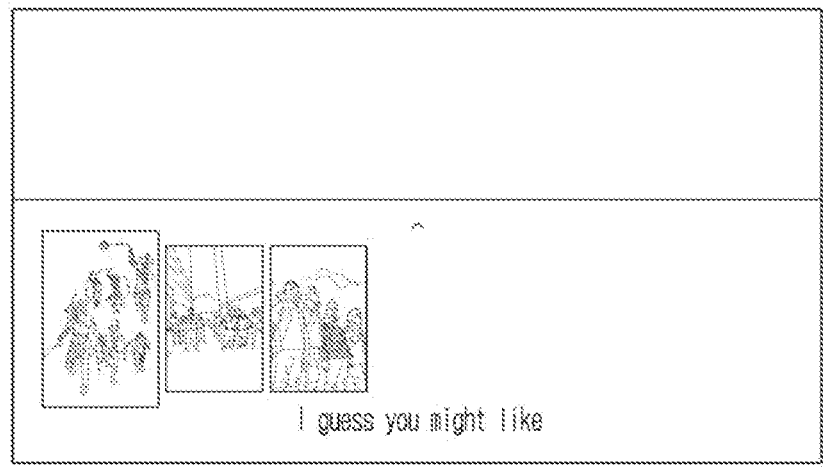
FIG. 16 is a diagram showing an effect of an original poster in Example I and an effect of the original poster optimized according to an embodiment.
Figure 16:
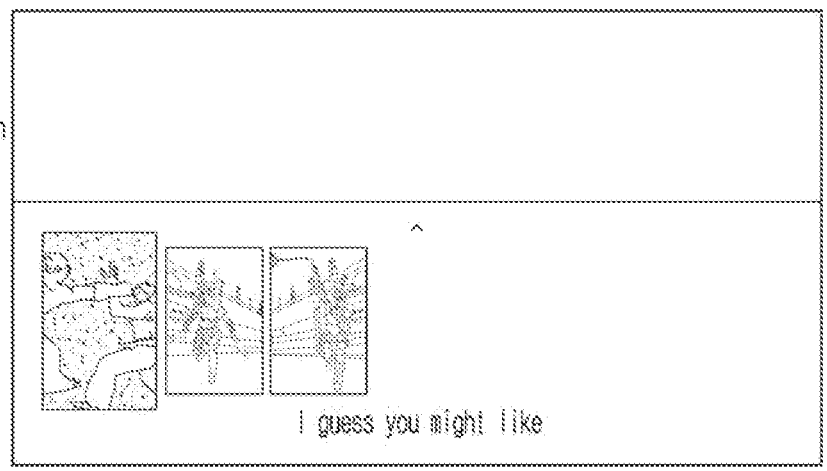

FIG. 16 shows an illustration of the original poster effect and the poster effect optimized using the embodiment. By comparison, it can be found that: the differentiation degree of the optimized poster theme in the example is higher.

Example II

With respect to different target scenes, different images need to be selected for recombination display, which is taken as an example for description in this embodiment.

Figure 17A:
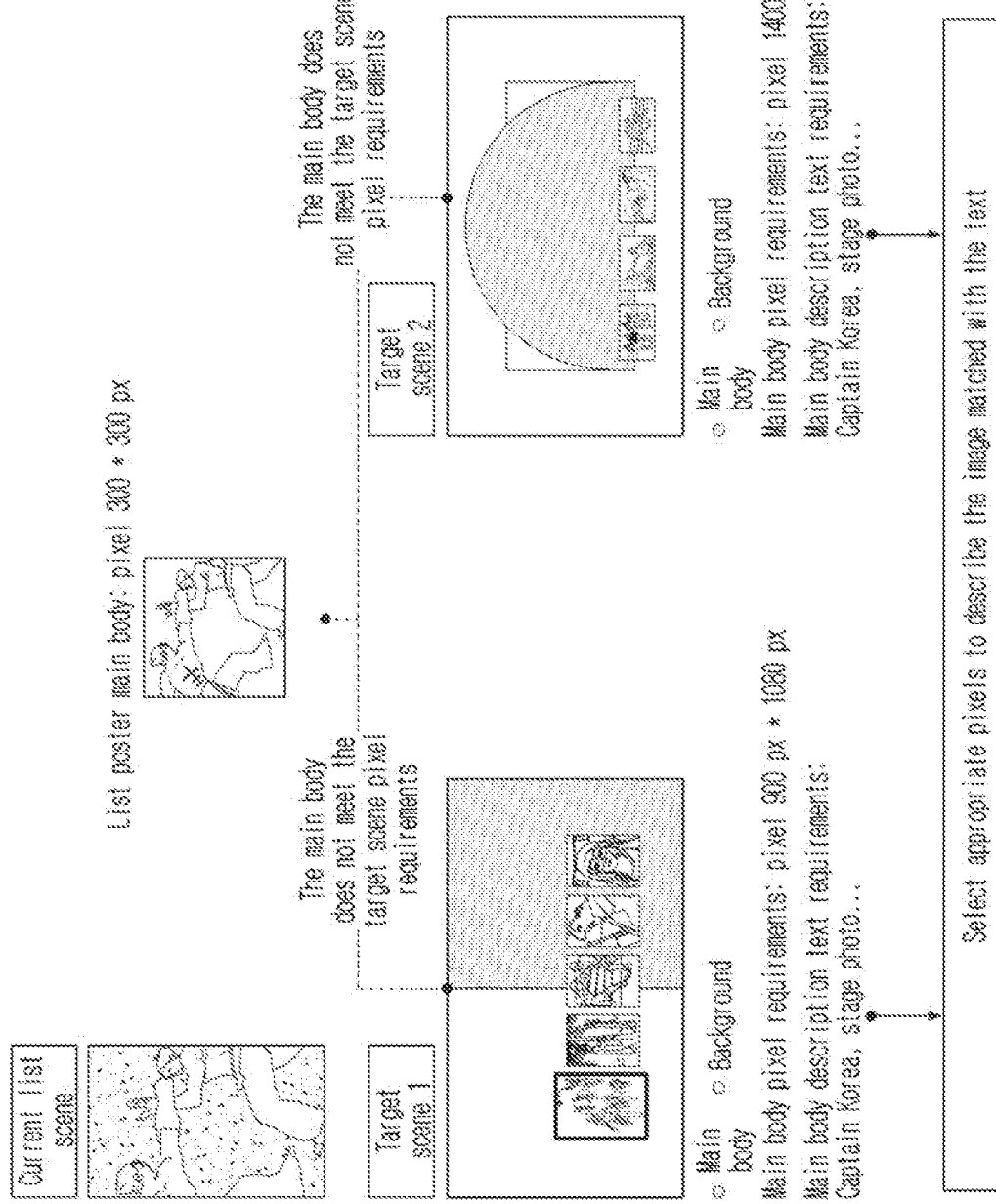
FIG. 17A is a first schematic diagram of an implementation process of Example II according to an embodiment.
Figure 17B:
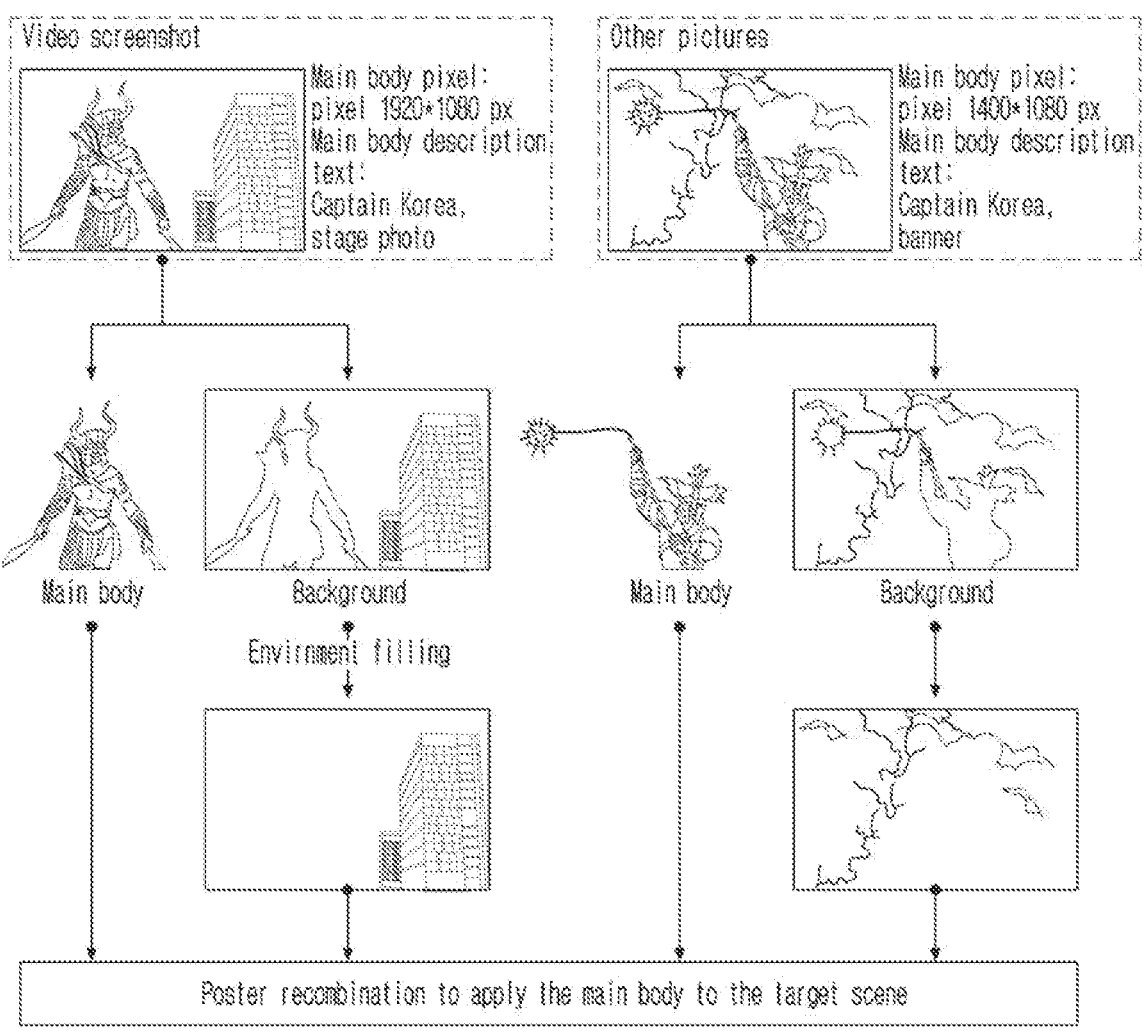
FIG. 17B is a second schematic diagram of an implementation process of Example II according to an embodiment.
Figure 17C:
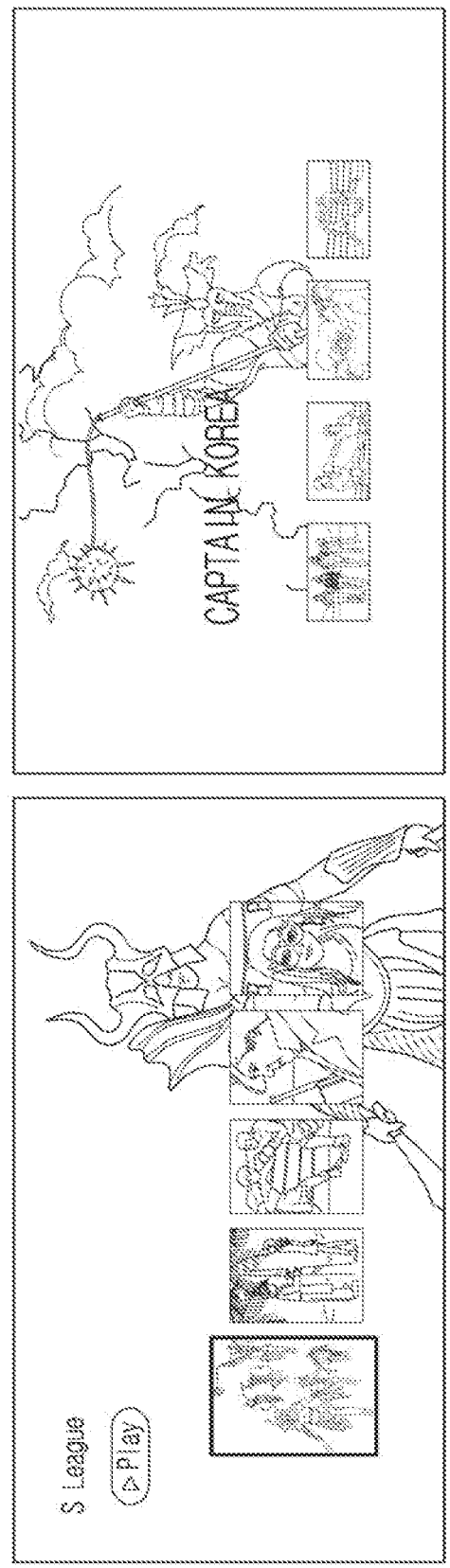
FIG. 17C is a third schematic diagram of an implementation process of Example II according to an embodiment.

FIGS. 17A, 17B and 17C are schematic diagrams of an implementation process of Example II described above. This example is illustrated with the program resource "Captain Korea".

Pixels of the poster main body in the current list are 300 px*300 px;

The pixel requirements of the target scene 1 to the poster main body are as follows: 900 px*1080 px, the requirements for the main body description text are: Captain Korea, stage photo . . . ;

The pixel requirements of the target scene 2 to the poster main body are as follows: 1400 px*800 px, the requirements for the main body description text are: Captain Korea, banner . . .

The program shows different scene requirements, from which it can be seen that the poster main bodies in the list do not meet the pixel requirements of the target scene 1 and the target scene 2, in which case the appropriate pixels need to be selected again according to the semantic comparison and the scene requirements, and the text-matched image is described.

In this example, after searching according to the above conditions, an image which has the main body pixel of 900 px*1080 px, the main description text of Captain Korea and stage photo is searched from the video screenshot, which meets the requirements of target scene 1, and an image which has the main body pixel of 1400 px*800 px, the main description text of Captain Korea and banner is searched from other pictures, which meets the requirements of target scene 2, as shown in FIG. 17A.

As shown in FIG. 17B, the searched images are processed in a similar manner to the Example I: separating an image into a main body, a background and characters, and then processing image elements, specifically includes: cutting out the main body from the image and storing for later use; cutting out characters from an image, converting the characters in a uniform format, and storing for later use; and cutting out the areas of the main body and the characters from the original background, cropping size according to the target scene, filling the blank positions with environment colors and generating a new background and storing for later use.

In FIG. 17C, merging the title characters, the main body and the background after the format conversion according to the corresponding positions according to the specification requirements of the target scene to generate a new display form, and applying to the corresponding target scene.

Figure 18:
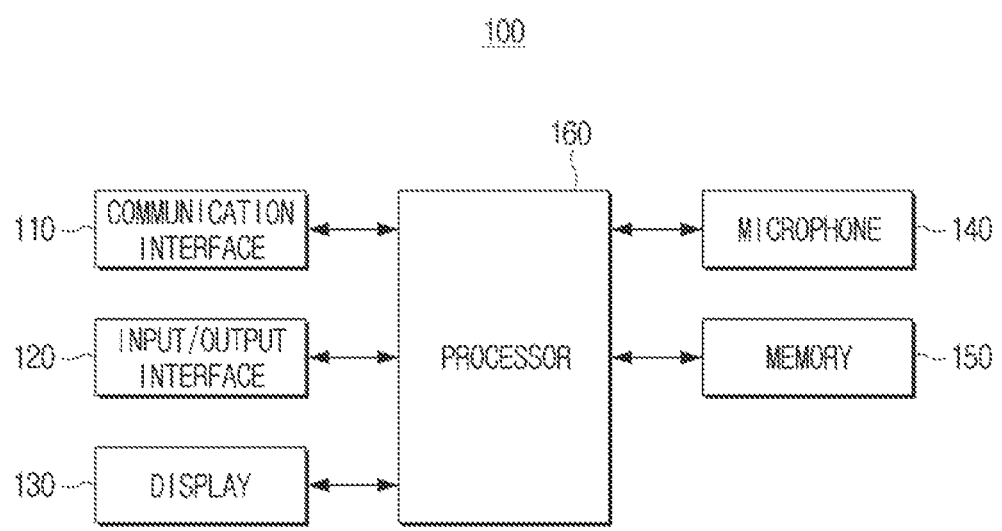
FIG. 18 is a block diagram illustrating an electronic apparatus according to an embodiment.

FIG. 18 is a block diagram illustrating configuration of an electronic apparatus according to an embodiment. An electronic apparatus 100 may include a communication interface 110, an input/output interface 120, a display 130, a microphone 140, a memory 150, and a processor 160. For example, the electronic apparatus 100 may be a display apparatus such as a TV. However, this is only an example, and the electronic apparatus 100 may be a set-top box.

The communication interface 110 includes at least one circuit, and may perform communication with an external apparatus or an external server. For example, the communication interface 110 may receive a command for selecting an image content from a remote controller or a user terminal. In addition, the communication interface 110 may receive an image content from an external apparatus or an external server.

The communication interface 110 may include a wireless communication module and a wired communication module. The wireless communication module may include at least one of a Bluetooth Low Energy (BLE) module, a Wi-Fi communication module, a cellular communication module, a $3^{rd}$ Generation (3G) mobile communication module, a $4^{th}$ Generation (4G) mobile communication module, a 4G Long Term Evolution (LTE) communication module, or $5^{th}$ Generation (5G) mobile communication module. The wired communication module may include an Ethernet module.

The input/output interface 120 may perform communication with an external apparatus. The input/output interface 120 may receive an image from an external apparatus (e.g., a set-top box, DVDP, etc.). Alternatively, when the electronic apparatus 100 is implemented as a set-top box, the electronic apparatus 100 may transmit an image to an external display apparatus through the input/output interface 120.

The input/output interface 120 may include at least one communication terminal. For example, the input/output interface 120 may include at least one of a High Definition Multimedia Interface (HDMI) port, a Display Port (DP) port, an RGB port, a Digital Visual Interface (DVI) port, a Thunderbolt port, a Universal Serial Bus (USB) port, a Video Graphics Array (VGA), a Dsubminiature (D-SUB) port, a LAN port, or a WAN port. According to an embodiment, the input/output interface 120 may include a port for inputting/outputting only audio signals and a port for inputting/outputting only image video signals separately, or may be implemented as one port that inputs/outputs both the audio signals and the video signals.

The display 130 may output an image under the control of the processor 160. For example, the display 130 may output a thumbnail image corresponding to an image content. In addition, the display 130 may output information regarding an image content. The information regarding an image content may include information regarding the title and genre of the image content.

The display 130 may be implemented as Liquid Crystal Display Panel (LCD), Organic Light Emitting Diodes (OLED), etc., and the display 130 may be a flexible display, a transparent display, etc. However, the display 130 according to an embodiment is not limited thereto, and may include other types of display.

An image according to an embodiment may be output not only by the display 130, but also by an external display apparatus (e.g., a user terminal). For example, if the electronic apparatus 100 is a set-top box, the image may be transmitted to an external display apparatus by the communication interface 110 and output by the external display apparatus.

The microphone 140 may obtain a user voice. The processor 160 may obtain a user voice through the microphone 140, and control the electronic apparatus 100 based on the user voice. For example, if the processor 160 obtains a voice command for selecting an image content, the processor 160 may control the display 130 to enlarge and display a thumbnail image corresponding to the selected image content.

The processor 160 may receive a user voice from an external apparatus. For example, the processor 160 may receive a user voice obtained through a microphone included in the external apparatus from a remote control device. Here, the external apparatus may include a user terminal and a remote control device. In this case, the received user voice may be a signal that is digitized by the external apparatus.

The memory 150 may store an Operating System (OS) for controlling the overall operations of the components of the electronic apparatus 100 and commands or data related to the components of the electronic apparatus 100. For example, the memory 150 may store data necessary for a module for controlling the operations of the electronic apparatus 100 to perform various operations. The module for controlling the operations of the electronic apparatus 100 may include a search keyword acquisition module, a poster database, a poster matching module, a scene matching module, an image segmentation module, an instance recognition module, an optical character recognition module, an environment filing module, and a post recombination module. The memory 150 may be implemented as a non-volatile memory (e.g., hard disk, Solid state drive (SSD), flash memory), a volatile memory, etc.

The processor 150 may be electrically connected to the memory 150 and control the overall functions and operations of the electronic apparatus 100. For example, the processor 160 may search to obtain a target video and at least one poster according to a user instruction. The processor 160 may calculate a matching degree of an image description text of the at least one poster and a description text keyword of the target video. The processor 160 may obtain the description text keyword of the target video according to description information of the target video. For each poster, the processor 160 may acquire the image description text by an Image Captain technology. The processor 160 may calculate the matching degree between the image description text of each poster and the description text keyword of the target video by using a word vector. The processor 160 may sort the at least one poster according to the matching degree from high to low, to obtain a sorted poster sequence.

The processor 160 may perform element separation on a poster with the highest matching degree in the poster sequence to obtain a main body element and a background element. The processor 160 may process the main body element, the background element and title information of the target video according to requirements of a target scene to synthesize a new poster. The processor 160 may place the main body element according to a preset main body position of the target scene. The processor 160 may stretch and/or tiling the background element according to a background range of the target scene. The processor 160 may perform unified style conversion on the title information of the target video, and placing it in a preset position of the target scene.

The processor 160 may filter out posters that do not meet physical size requirements of the target scene after obtaining the at least one poster by searching.

The processor 160 may perform element separation on the poster with the highest matching degree in the poster sequence to obtain a main body element and a background element comprises: performing the following operations on the poster with the highest matching degree in the poster sequence. The processor 160 may perform instance recognition on the poster to obtain the main body element in the poster. The processor 160 may perform optical character recognition on the poster to recognize characters in the poster. The processor 160 may cut out the main body element and the characters from the poster, and obtaining the background element after performing an environment filling to blank regions.

The processor 160 may obtain a description text keyword of the target video according to the description information of the target video. The processor 160 may acquire the image description text of each poster by an Image Caption technology. The processor 160 may calculate the matching degree between the image description text of each poster and the description text keyword of the target video by using the word vector. The processor 160 may sort the corresponding posters according to the calculated matching degree from high to low.

The processor 160 may filter a poster not meeting physical size requirements of the target scene from the at least one poster obtained from searching.

The processor 160 may perform instance recognition on the poster to obtain the main body element in the poster. The processor 160 may perform optical character recognition on the poster and recognizing characters in the poster. The processor 160 may perform environment filing on the blank regions of the poster after cutting out the main body element and the characters to obtain the background element.

The processor 160 may place the main body element according to a preset main body position of the target scene. The processor 160 may stretch tiling and/or environment filling the background element according to the background range of the target scene. The processor 160 may perform unified style conversion on the title information of the target video, and place it in a preset position of the target scene.

While the foregoing description is made with respect to the embodiments of the disclosure, it should be understood that the above-described embodiments are not intended to limit the scope of the disclosure. It should be understood that any modification, replacement and/or improvement made within the spirit and principle of the disclosure should fall within the protection scope of the disclosure.

What is claimed is:

1. A method for displaying a video poster based on artificial intelligence, the method comprising:
    obtaining a target video and at least one poster according to a user input, calculating a matching degree of an image description text of the at least one poster and a description text keyword of the target video, and sorting the at least one poster according to the matching degree in an order from high to low, to obtain a sorted poster sequence;

performing element separation on one of the at least one poster with a highest matching degree in the poster sequence to obtain a main body element corresponding to a protagonist and a background element; and processing the main body element, the background element and title information of the target video according to requirements of a target scene to synthesize a new poster wherein the performing the element separation on the one of the at least one poster with the highest matching degree in the poster sequence to obtain the main body element and the background element comprises:

performing instance recognition on the one of the at least one poster to obtain the main body element;

performing optical character recognition on the one of the at least one poster to recognize characters;

cutting out the main body element and the characters from the one of the at least one poster, and obtaining the background element after performing an environment filling to blank regions.

2. The method of claim 1, wherein the calculating the matching degree of the image description text of the at least one poster and the description text keyword of the target video comprises:

obtaining the description text keyword of the target video according to description information of the target video;

acquiring the image description text by an Image Caption technology for each poster among the at least one poster; and calculating the matching degree between the image description text of the each poster among the at least one poster and the description text keyword of the target video by using a word vector.

3. The method of claim 1, further comprising:

filtering out a poster that does not meet physical size requirements of the target scene from the at least one poster.

4. The method of claim 1, wherein the processing the main body element, the background element and the title information of the target video according to the requirements of the target scene to synthesize the new poster comprises:

placing the main body element according to a preset main body position of the target scene;

performing stretching or tiling the background element according to a background range of the target scene; and performing unified style conversion on the title information of the target video, and placing the title information in a preset position of the target scene.

5. A system for displaying a video poster based on artificial intelligence, comprising:

a search keyword acquisition module configured to search a poster database according to a user input and obtain a target video and at least one poster;

a poster matching module configured to calculate a matching degree of the image description text of the at least one poster and a description text keyword of the target video, and sorting the at least one poster according to the matching degree in an order from high to low, to obtain a sorted poster sequence;

an image segmentation module configured to perform element separation on one of the at least one poster with the highest matching degree in the poster sequence to obtain a main body element corresponding to a protagonist and a background element; and a poster recombination module configured to process the main body element, the background element and title information of the target video according to requirements of a target scene to synthesize a new poster, wherein the image segmentation module comprises:

an instance recognition module configured to perform instance recognition on the one of the at least one poster to obtain the main body element in the poster;

an optical character recognition module configured to perform optical character recognition on the one of the at least one poster and recognizing characters; and an environment filling module configured to perform environment filling on blank regions of the one of the at least one poster after cutting out the main body element and the characters to obtain the background element.

6. The system of claim 5, wherein the search keyword acquisition module is further configured to obtain the description text keyword of the target video according to description information of the target video;

the poster matching module comprises:

an image automatic description module configured to acquire the image description text by an Image Caption technology, for each poster among the at least one poster; and a word vector sorting module configured to calculate the matching degree between the image description text of the each poster among the at least one poster and the description text keyword of the target video by using a word vector.

7. The system of claim 6, wherein the poster matching module further comprises a scene matching module for filtering a poster that does not meet physical size requirements of the target scene from the at least one poster.

8. The system of claim 5, wherein the poster recombination module is further configured to:

place the main body element according to a preset main body position of the target scene;

perform stretching, tiling or environment filling on the background element according to a background range of the target scene; and perform unified style conversion on the title information of the target video, and placing the title information in a preset position of the target scene.

9. An electronic apparatus comprising:

a memory configured to store at least one instruction; and a processor configured to:

obtain a target video and at least one poster according to a user input, calculate a matching degree of an image description text of the at least one poster and a description text keyword of the target video, and sort the at least one poster according to the matching degree in an order from high to low, to obtain a sorted poster sequence;

perform element separation on one of the at least one poster with a highest matching degree in the poster sequence to obtain a main body element corresponding to a protagonist and a background element; and process the main body element, the background element and title information of the target video according to requirements of a target scene to synthesize a new poster, wherein the processor is further configured to:

perform instance recognition on the one of the at least one poster to obtain the main body element;

perform optical character recognition on the one of the at least one poster to recognize characters; and cut out the main body element and the characters from the one of the at least one poster, and obtain the background element after performing an environment filling to blank regions.

10. The electronic apparatus of claim 9, wherein the processor is further configured to:

obtain the description text keyword of the target video according to description information of the target video;

acquire the image description text by an Image Caption technology for each poster among the at least one poster; and calculate the matching degree between the image description text of the each poster among the at least one poster and the description text keyword of the target video by using a word vector.

11. The electronic apparatus of claim 9, wherein the processor is further configured to:

filter out a poster that does not meet physical size requirements of the target scene from the at least one poster.

12. The electronic apparatus of claim 9, wherein the processor is further configured to:

place the main body element according to a preset main body position of the target scene;

perform stretching or tiling the background element according to a background range of the target scene; and perform unified style conversion on the title information of the target video, and placing the title information in a preset position of the target scene.

* * * * *